United States Patent [19]

Miyoshi et al.

[11] Patent Number: 5,646,917
[45] Date of Patent: Jul. 8, 1997

[54] CARRIER SYSTEM FOR CARRYING MEDIUMS

[75] Inventors: Sokichi Miyoshi; Mikio Kanai; Akira Yamaguchi; Masaya Ogawa, all of Saitama-ken, Japan

[73] Assignee: Pioneer Electronic Corporation, Tokyo, Japan

[21] Appl. No.: 554,823

[22] Filed: Nov. 7, 1995

[30] Foreign Application Priority Data

Nov. 8, 1994 [JP] Japan .................. 6-298806

[51] Int. Cl.⁶ ............... G11B 17/22; G11B 17/04
[52] U.S. Cl. ............... 369/34; 369/38; 369/178; 369/191
[58] Field of Search ............. 360/91, 92, 98.04, 360/98.06, 99.02, 99.03, 99.06, 99.07; 369/33, 34, 36, 38, 178, 179, 191, 192, 197; 310/12, 14; 318/135; 414/281; 104/290, 292, 294

[56] References Cited

U.S. PATENT DOCUMENTS

| | | | |
|---|---|---|---|
| 4,789,815 | 12/1988 | Kobayashi et al. | 104/290 |
| 4,848,242 | 7/1989 | Matsuo | 104/290 |
| 5,189,652 | 2/1993 | Inoue | 369/36 |
| 5,414,679 | 5/1995 | Menke | 369/36 |
| 5,473,992 | 12/1995 | Takei | 104/290 |

FOREIGN PATENT DOCUMENTS

| | | | |
|---|---|---|---|
| 298194 | 1/1989 | European Pat. Off. | 104/290 |
| 2131302 | 5/1990 | Japan | 104/290 |
| 3-49506 | 3/1991 | Japan | 104/292 |
| 4-8102 | 1/1992 | Japan | 104/292 |

*Primary Examiner*—Stuart S. Levy
*Assistant Examiner*—David L. Ometz
*Attorney, Agent, or Firm*—Nikaido, Marmelstein, Murray & Oram LLP

[57] ABSTRACT

A stocker box stocking a plurality of CDs and a player box adjacent to the stocker box are disposed next to each other. Each of the boxes has an opening on a side wall so as to oppose to an opening formed on a side wall of the adjacent box. A horizontal guide rail device is provided in each box, extending to the opening thereof. A horizontal carrier is provided to be moved along the guide rail devices of the stocker and second player boxes passing through the openings. A plurality of coils are mounted on each of the guide rail devices, arranged in a moving direction of the horizontal carrier. The horizontal carrier has a magnet to form a magnetic field passing through some of the coils. The coils are sequentially excited so as to move the carrier in the moving direction.

4 Claims, 19 Drawing Sheets

CARRIER SYSTEM FOR CARRYING MEDIUMS

BACKGROUND OF THE INVENTION

The present invention relates to a system for carrying mediums such as recording mediums or CDs of an automatic disc player such as a singalong system.

Recently, a singalong system using an optical disc (laser disc) or a compact disc has become popular. In the singalong system, an automatic disc player system is provided for automatically taking out a selected disc by the user and reproducing it. After reproducing, the disc is automatically returned to a storing position. The disc player system comprises a commander for controlling a selecting operation and a plurality of automatic changers each of which is operated to change and reproduce the disc.

FIG. 22 shows an example of the disc player system having a pair of stocker units 10 and 30, each having a plurality of discs 70 such as video discs and CDs stacked in a column, and a disc player unit 20 having a plurality of disc players and attached to the stocker units 10 and 30 therebetween. The stocker units 10 and 30 and the player unit 20 have opposite guide rails 11, 31 and 21, respectively at the upper rear portions thereof, each aligned at the same height. A pulley 51a connected to a motor 50 is provided in the stocker unit 10 adjacent the end portion of the guide rails 11, and a pulley 51b is provided in the stocker unit 20 adjacent the end portion of the guide rails 31. A wire 60 on which a laterally moving carrier 40 is mounted is provided between the pulleys 51a and 51b so that when the motor 50 is driven, the carrier 40 slides along the guide rails 11, 21 and 31. The stocker unit 10 is provided with a carrier 15 having a handling device 16. The carrier 15 moves vertically in the front portion of the stocker 10 along the column of discs 70 and horizontally between the front and rear thereof. Similarly, the stocker unit 30 is provided with a carrier 35 having a handling device 35, and the player unit 20 is provided with a carrier 25 having a handling device 26.

In operation, if a disc to be played in the player unit 20 is stored in the stocker unit 10, the carrier 15 is lowered to a position confronting the desired disc 70 and retrieves it with the handling device 16. The carrier 15 carries the disc 70 to the upper portion of the stocker unit 10 and further to the rear portion thereof. At the same time, the lateral carrier 40 is positioned at a waiting position 12 so that the disc 70 held by the carrier 15 is transported on to the carrier 40 by the handling device 16. The carrier 40 then slides on the guide rails 11 and 21 to a position 22 as shown in FIG. 23. The disc 70 is then transported from the carrier 40 to the waiting carrier 25 by the handling device 26. The carrier 25 accordingly moves to the front position of the player unit 20 and further lowered so as to load the disc 70 in one of the disc players.

In such a system, the wire 60 must be extended through the entire lateral length of the system. In order to add a new unit to the system, the wire must be exchanged. Moreover the pulleys 51a and 51b must be provided at the ends of the extended system. Hence, the units 10 and 30 housing the pulleys 51a and 51b must always be positioned at the ends of the system.

Another problem which occurs in the system is that the guide rails 11, 21 and 31 may displace from the initial horizontal positions thereof. Namely, the guide rails 11, 21 and 31 may be staggered from each other, thereby preventing a smooth sliding of the carrier 40.

SUMMARY OF THE INVENTION

An object of the present invention is to provide a carrier system for transporting medium between the units, so constructed as to allow the units to be freely added and removed, and positions thereof to be changed.

Another object is to provide a carrier system where the disc is smoothly moved between the units.

According to the present invention, there is provided a system for carrying a medium between a first box and a second box adjacent to the first box, comprising each of the first and second boxes having an opening on a side wall so as to oppose to an opening formed on a side wall of the adjacent box, a horizontal guide rail device provided in each of the first and second boxes, extending to the opening thereof, a carrier provided to be moved along the guide rail devices of the first and second boxes, a plurality of coils mounted on each of the guide rail devices, arranged in a moving direction of the horizontal carrier.

A magnet is provided on the horizontal carrier to form a magnetic field passing through some of the coils, detector means is provided for detecting a position of the horizontal carrier and for producing a position signal. In response to the position signal, a controller excites the coils for moving the carrier in the moving direction.

The other objects and features of this invention will become understood from the following description with reference to the accompanying drawings.

DETAILED DESCRIPTION OF THE PREFERRED EMBODIMENTS

Figure 1:
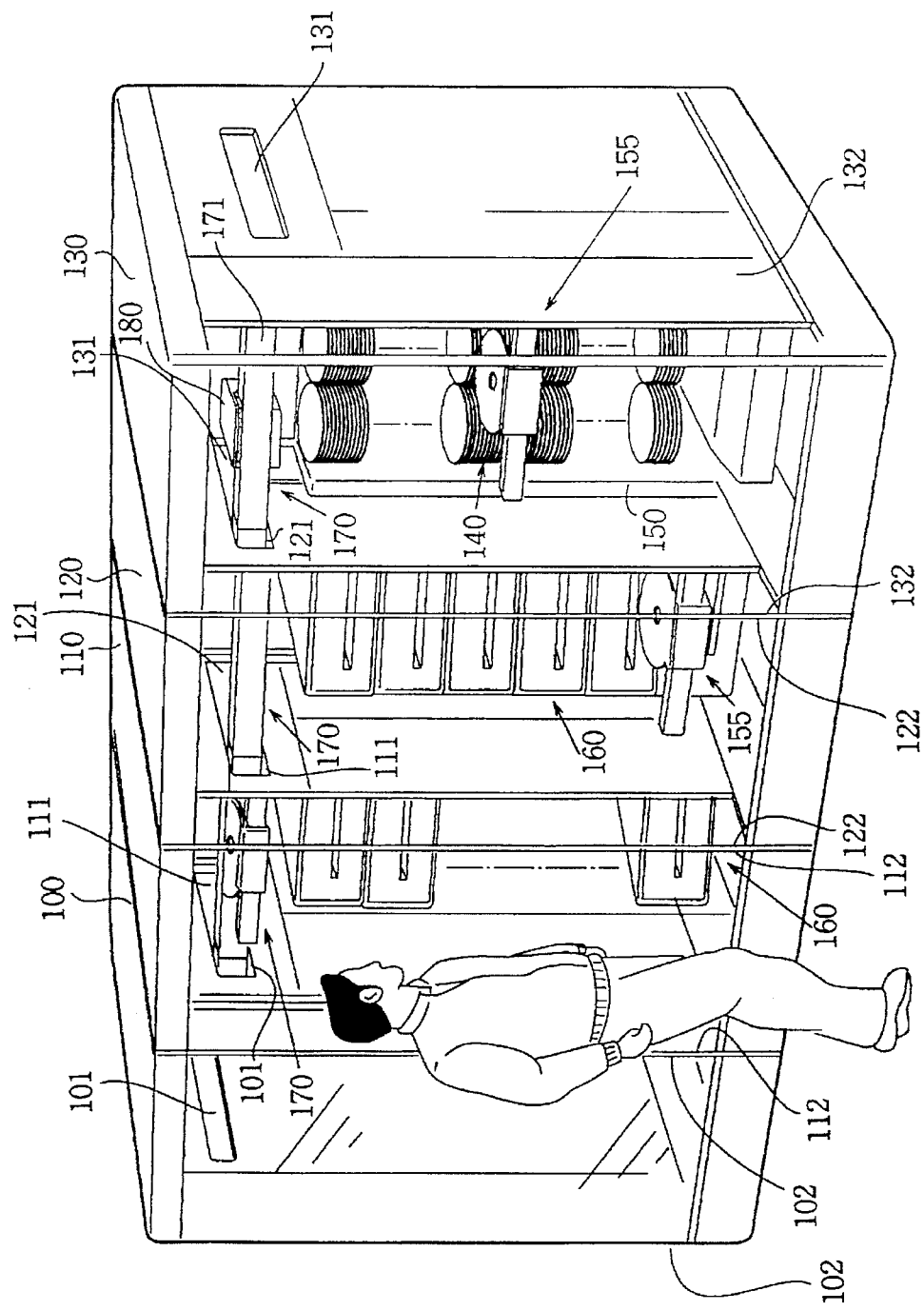
FIG. 1 is a perspective view of an automatic disc player system to which the present invention is applied.
Figure 2:
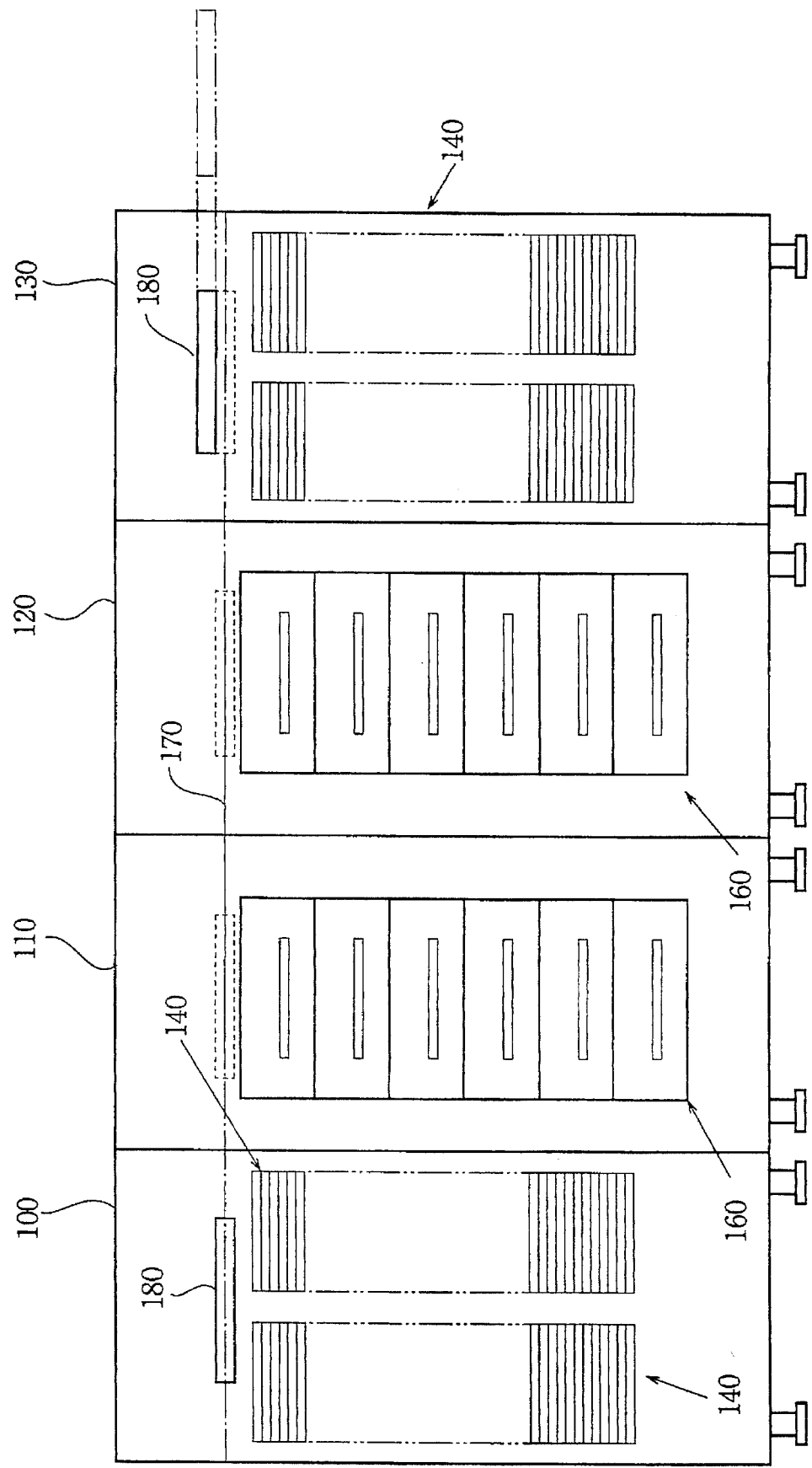
FIG. 2 is a front elevational view of the automatic disc player of FIG. 1.
Figure 3:
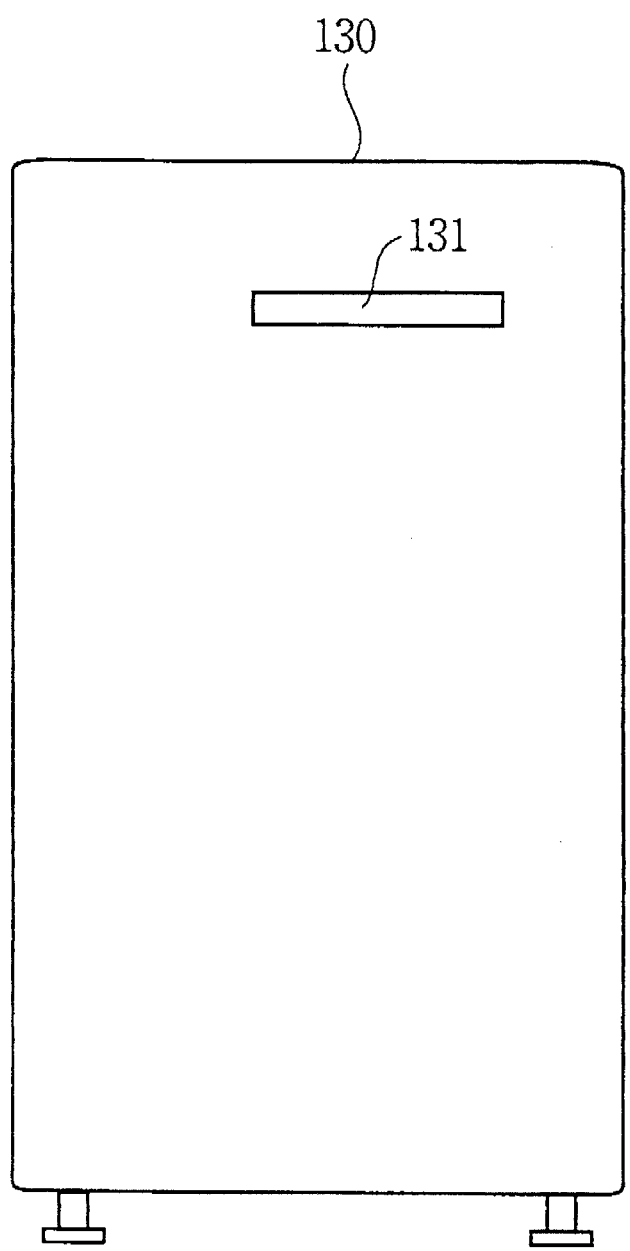
FIG. 3 is a side elevational view of the automatic disc player of FIG. 1.

Referring to FIGS. 1 to 3, an automatic disc player system to which the present invention is applied, comprises a pair of stocker units 100 and 130 each comprising a box, for storing a plurality of discs 140 such as video discs and CDs, and a pair of player units 110 and 120 each comprising a box, provided between the stocker units 110 and 130, for playing the discs 140. The units 100, 110, 120 and 130 have side panels 102, 112, 122 and 132, respectively, each attached to the side panel of the adjacent unit.

In each of the stocker units 110 and 130, the discs 140 are stocked in two columns. A vertical carrier 155 having a handling device 156 (FIG. 5) vertically slides along a guide panel 150 at the front portion of each of the stocker units 110 and 130 for retrieving one of the discs 140 and carrying the disc 140 to the upper portion of the units.

Each of the player units 120 and 130 has a plurality of vertically arranged disc players 160, in the present embodiment, six players. The player units 120 and 130 each has the carrier 155 adapted to slide in the front portion thereof to set one of the discs 140 to the appropriate player 160.

Figure 5:
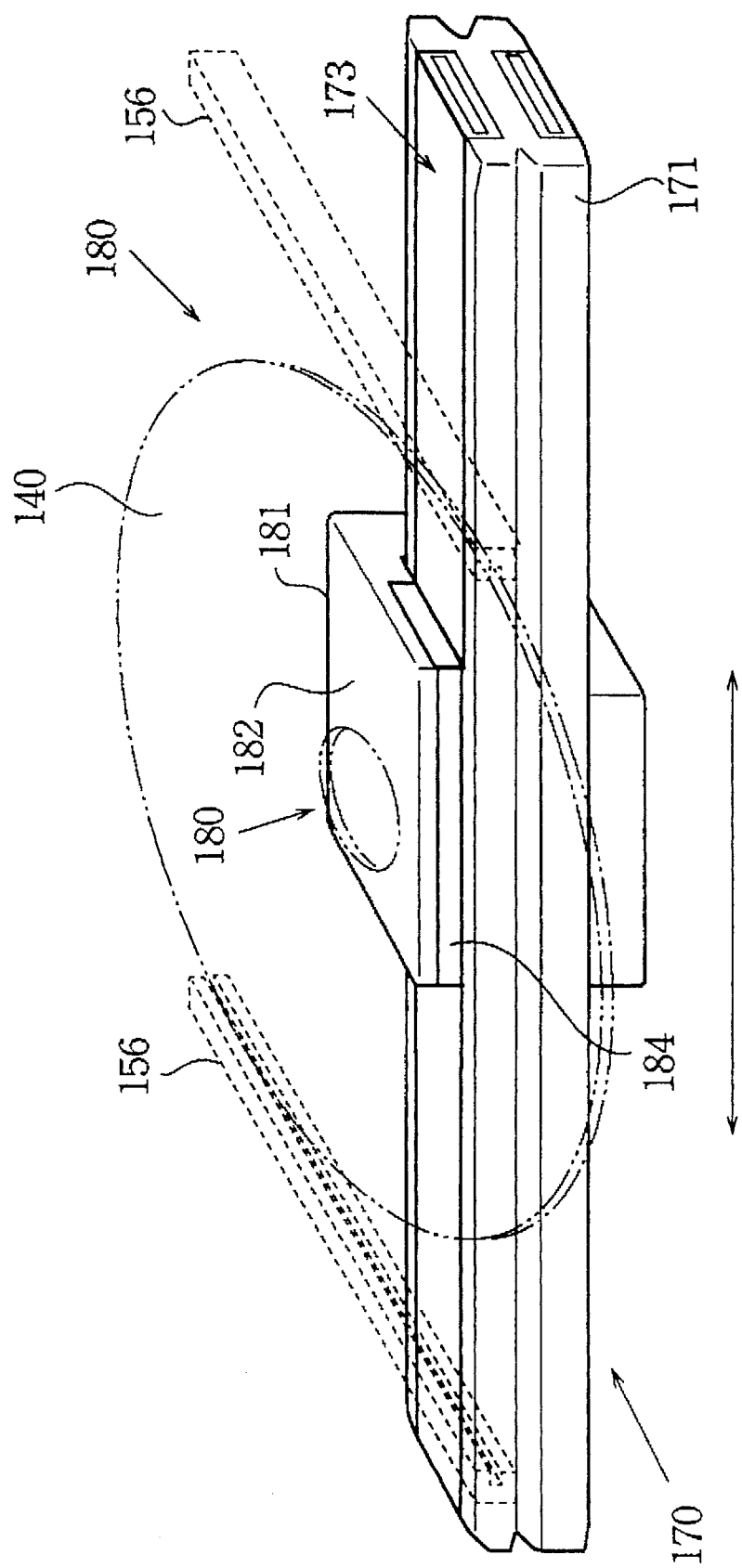
FIG. 5 is a perspective view of a carrier system of the present invention, provided in the automatic disc player of FIG. 1.
Figure 6:
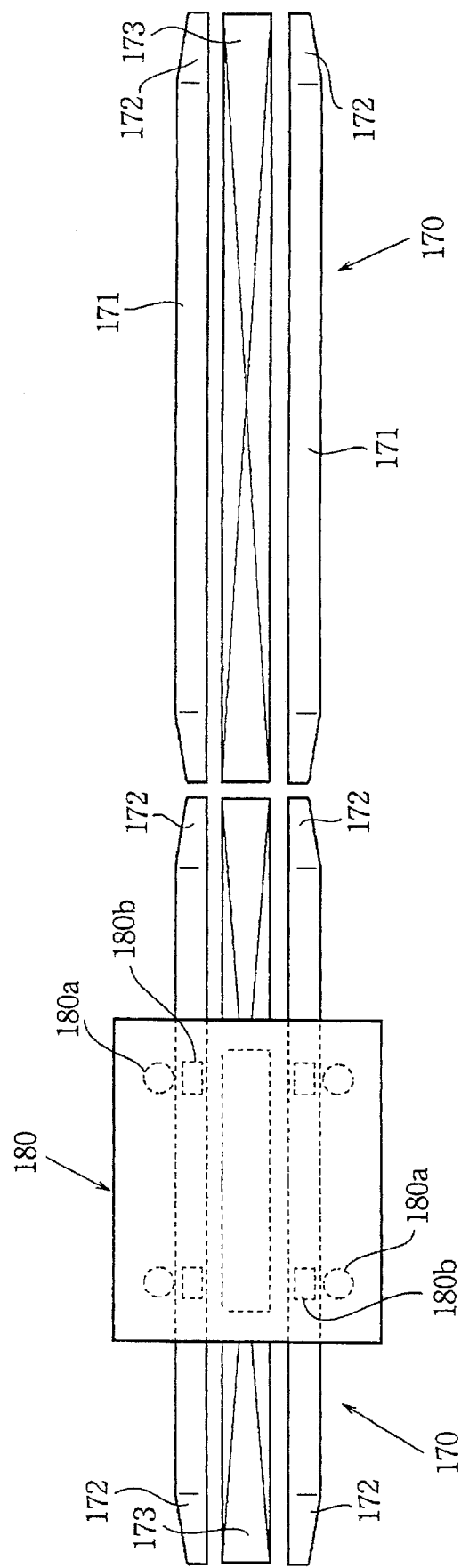
FIG. 6 is a detailed plan view of the carrier system of FIG. 5.
Figure 7:
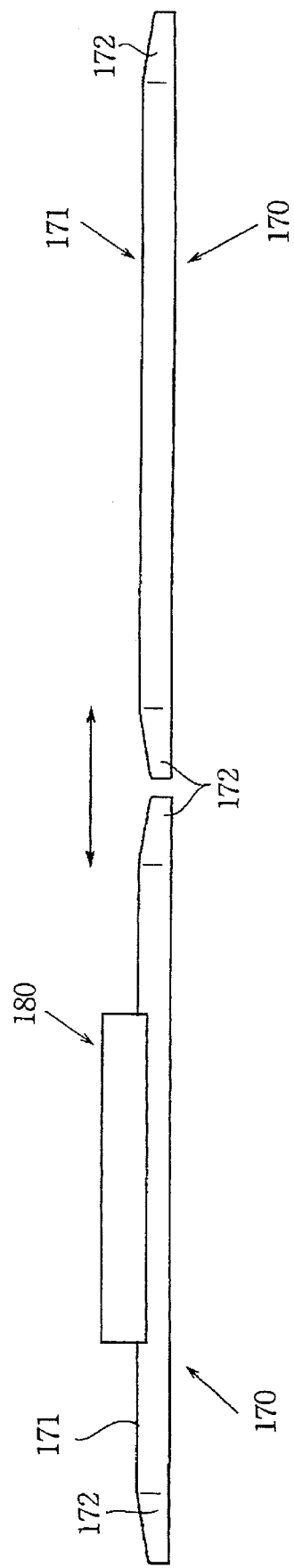
FIG. 7 is an elevational view of the carrier system of FIG. 5.
Figure 8:
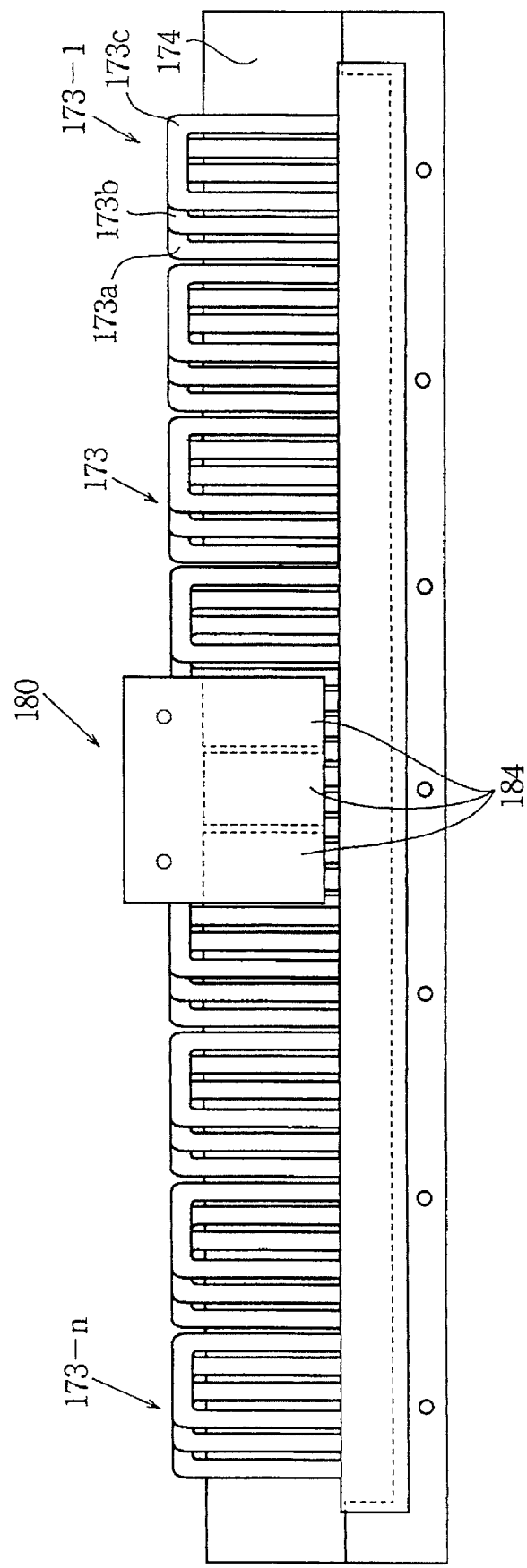
FIG. 8 is a plan view of a guide rail provided in the carrier system of FIG. 5.
Figure 9:
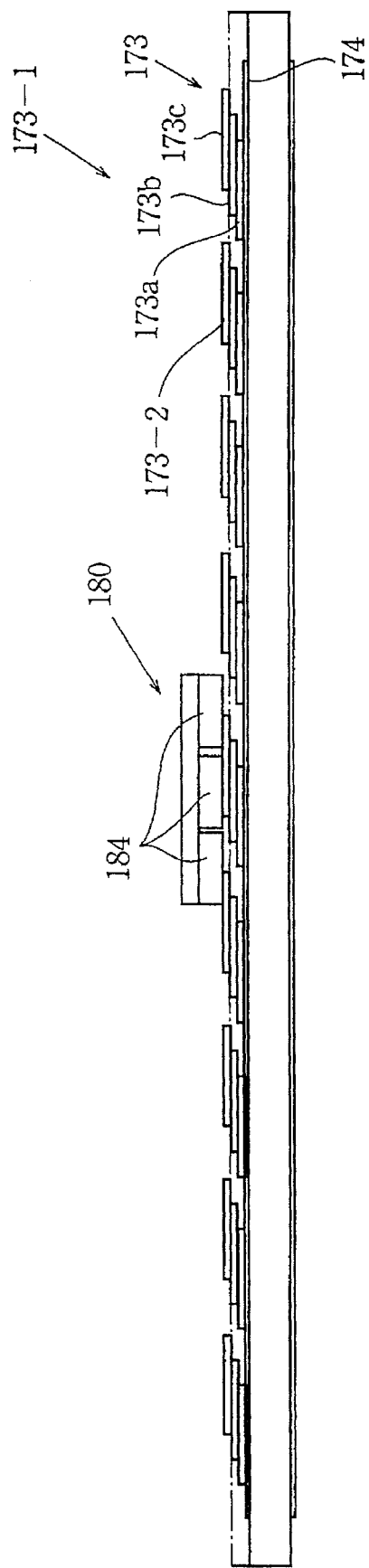
FIG. 9 is an elevational view of the guide rail of the carrier system of FIG. 5.
Figure 11:
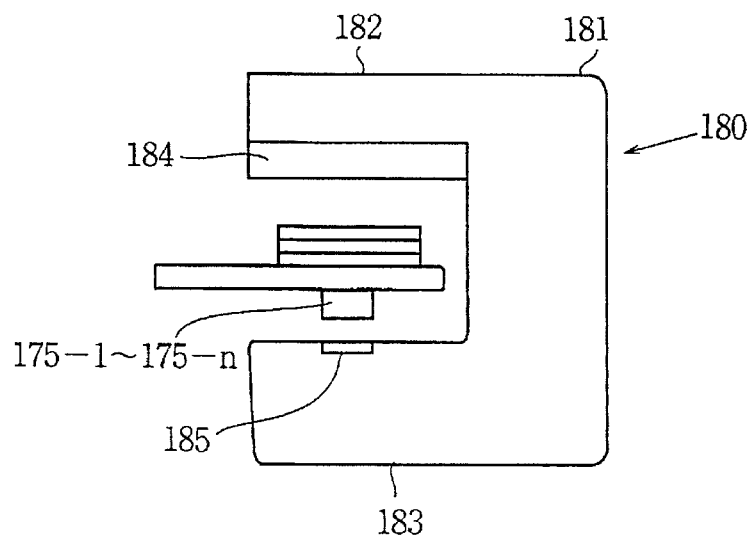
FIG. 11 is a sectional view showing a carrier of the carrier system of FIG. 5.

The side panels 102, 112, 122 and 132 are provided with respective openings 101, 111, 121 and 131 at the upper portion of the units as shown in FIGS. 1 and 3. A horizontal guide rail device 170 is provided in each units 100, 110, 120, and 130 adjacent the respective openings. Referring to FIGS. 5 and 6, the guide rail device 70 comprises a pair of guide rails 171 on which a horizontal carrier 180 for carrying the disc 140 slides, and a coil device 173 provide between the guide rails 171. As shown in FIG. 8, the coil device 173 comprises a coil base 174 on which a plurality of coil units are provided, each comprising three coils 173a, 173b and 173c, thereby forming a triple layered construction. Thus, the coil unit comprises coil unit 173-1 to coil unit 173-n as shown in FIG. 8. A plurality of equidistantly disposed position sensors 175-1, . . . 175-n each comprising a Hall element are provided under the coil base 174 as shown in FIG. 11. The upper section of the ends of the guide rails 71 are cut away, thereby forming slants 172. Hence, although the horizontal position of the guide rails 171 may be somewhat displaced, it is possible for the carrier 180 to overcome any gap caused by such a displacement, there smoothly sliding along the guide rails 171 of the units 100, 110, 120 and 130.

Figure 10:
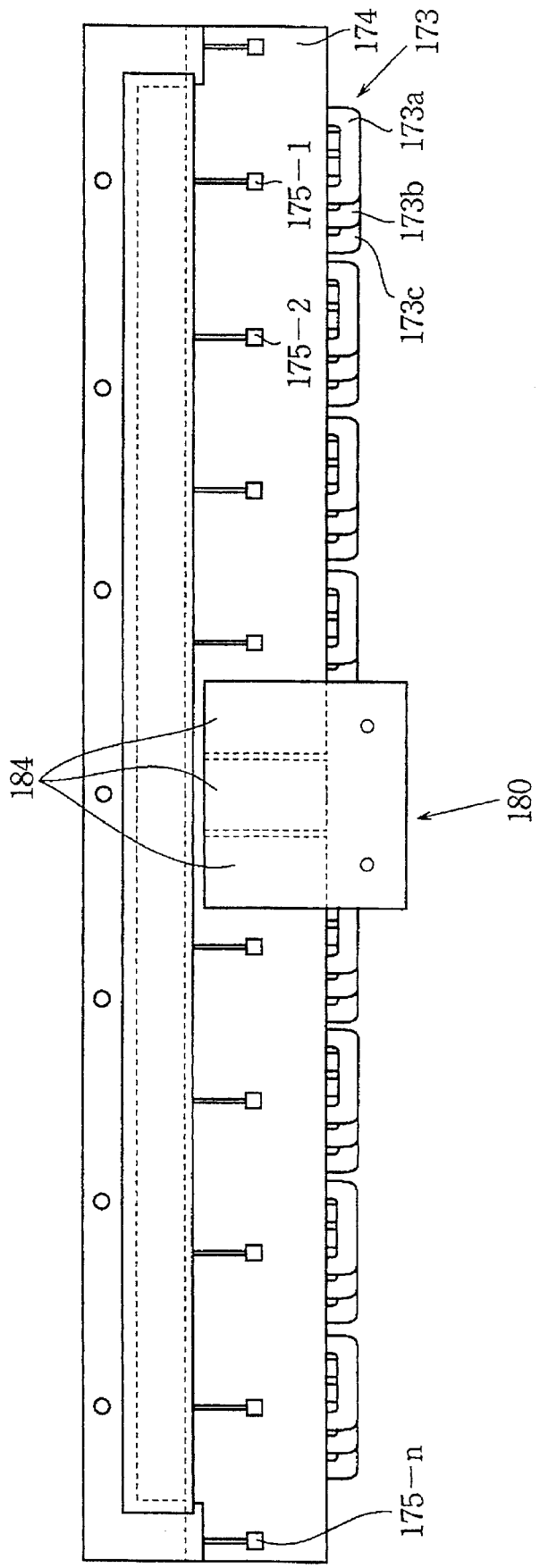
FIG. 10 is a bottom view of the guide rail.

Referring to FIG. 11, the carrier 180 has a U-shaped section so as to engage with the guide rails 171 of the carrier device 170 and comprises an upper section 182, a lower section 183 and a vertical section 181 connecting the upper and lower sections 182 and 183. As shown in FIG. 6, a pair of rollers comprising a side roller 180a and an upper roller 180b which roll on the guide rails 171 are provided on the under side of the upper section 182 at the four corners of the carrier 180. Furthermore, at the intermediate portion of the upper section 182, three magnets 184 are attached on the underside thereof as shown in FIGS. 10 and 11.

Figure 12:
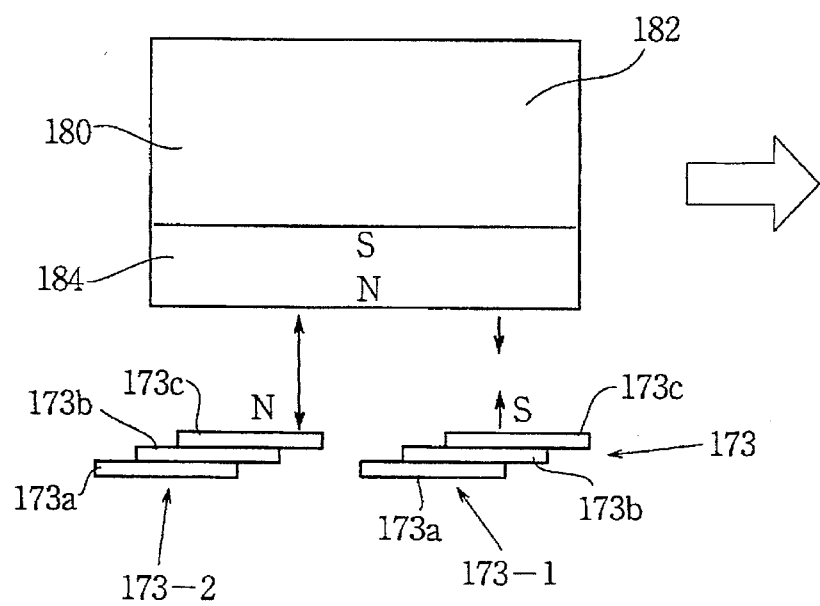
FIG. 12 is an illustration explaining the operation of the carrier of FIG. 11.

Namely, the guide rail device 170 of the present invention is adapted to move the carrier 180 by a magnetic force generated between the guide rail device 170 and the carrier 180. For example as shown in FIG. 12, the coils 173a, 173b and 173c of the coil unit 173-1 and those of the adjacent coil unit 173-2 are exited so that the magnetic poles thereof becomes south and north, respectively. The magnet 184 of the carrier 180 opposite the guide rail device 170 is attracted to the coil unit 173-1 and is repulsive to the coil unit 173-2, thereby moving in a direction shown by the arrow. That is to say, the moving force of the carrier 180 is caused by the repulsive between the magnet 184 and the coil unit 173-2 and the direction thereof is determined by the attraction between the magnet 184 and the coil unit 173-1. Since the attraction between the magnet 184 and the coil unit need not be large, only a small current is necessary.

In order to detect the position of the carrier 180, a magnet 185 is provided on the lower section 183 of the carrier 180 as shown in FIG. 11. The magnetic force of the magnet 185 is detected by the sensors 175-1 to 175-n.

Figure 13:
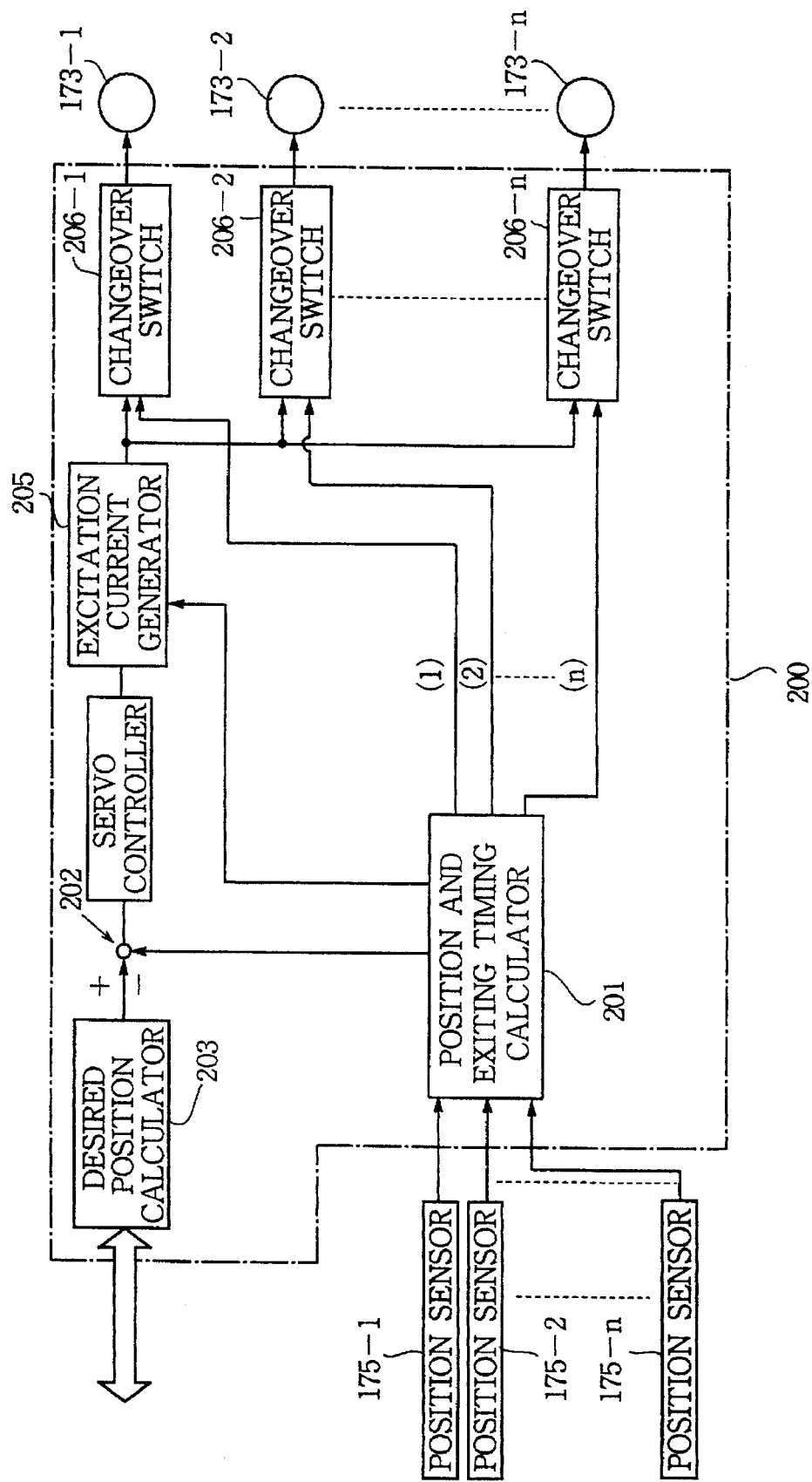
FIG. 13 is a block diagram showing a control system of the carrier system.

The carrier 180 can be inserted and taken out of the units as desired through the openings 101 and 131 at the end sides of the units 100 and 130, respectively. After the carrier 180 is set, the openings 101 and 131 are closed with a stopper (not shown) provided adjacent the openings. Alternatively, means for stopping the supply of the excitation current to the coil units when the carrier 180 approaches the openings may be provided. Hence the carrier 180 is prevented from slipping out of the units 110 and 130 through the respective openings 101 and 131. Referring to FIG. 13, a control system 200 for operating the carrier device 170 comprises a position and exciting timing calculator 201 to which the output signals of the position sensors 175-1, 175-2 . . . 175-n are applied. The position and exciting timing calculator 201 calculates the position of the carrier 180 and timings for supplying and cutting off the current to the coils are determined based on the position.

An actual position signal from the position and excitation timing calculator 201 representing the present position of the carrier 180 is applied to an adder 202 to which a desired position signal from a desired position calculator 203 is applied. The added desired and actual position signal is fed to a servo controller 204 which applies a command signal to the excitation current generator 205. A control signal from the position and excitation timing calculator 201 is further applied to the excitation current generator 205 so that an excitation current in a form of a three-phase square wave is accordingly generated at an appropriate timing. The excitation current is applied to each of the coil units 173-1, 173-2 . . . 173-n through respective changeover switches 206-1, 206-2 . . . 206-n. The changeover timings of the switches 206-1, 206-2 . . . 206-n are further controlled by rail changeover signals (1), (2) . . . (n) from the position and excitation timing calculator 201.

The operation of the automatic disc player system is described hereinafter with reference to FIGS. 4, 14 to 19.

Figure 14:
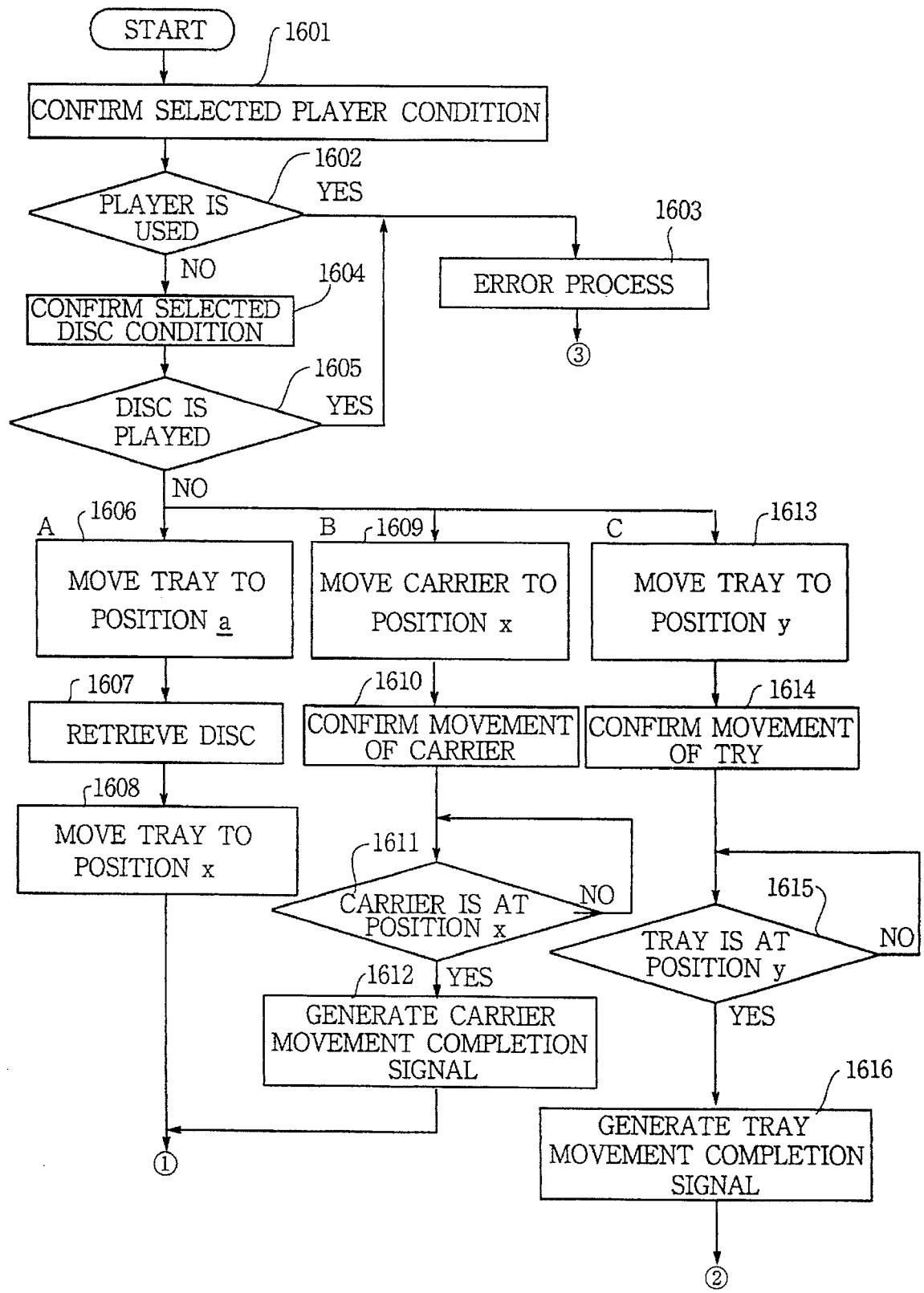
FIGS. 14 and 15 show a flowchart explaining the operation of the automatic disc player when playing a disc.
Figure 15:
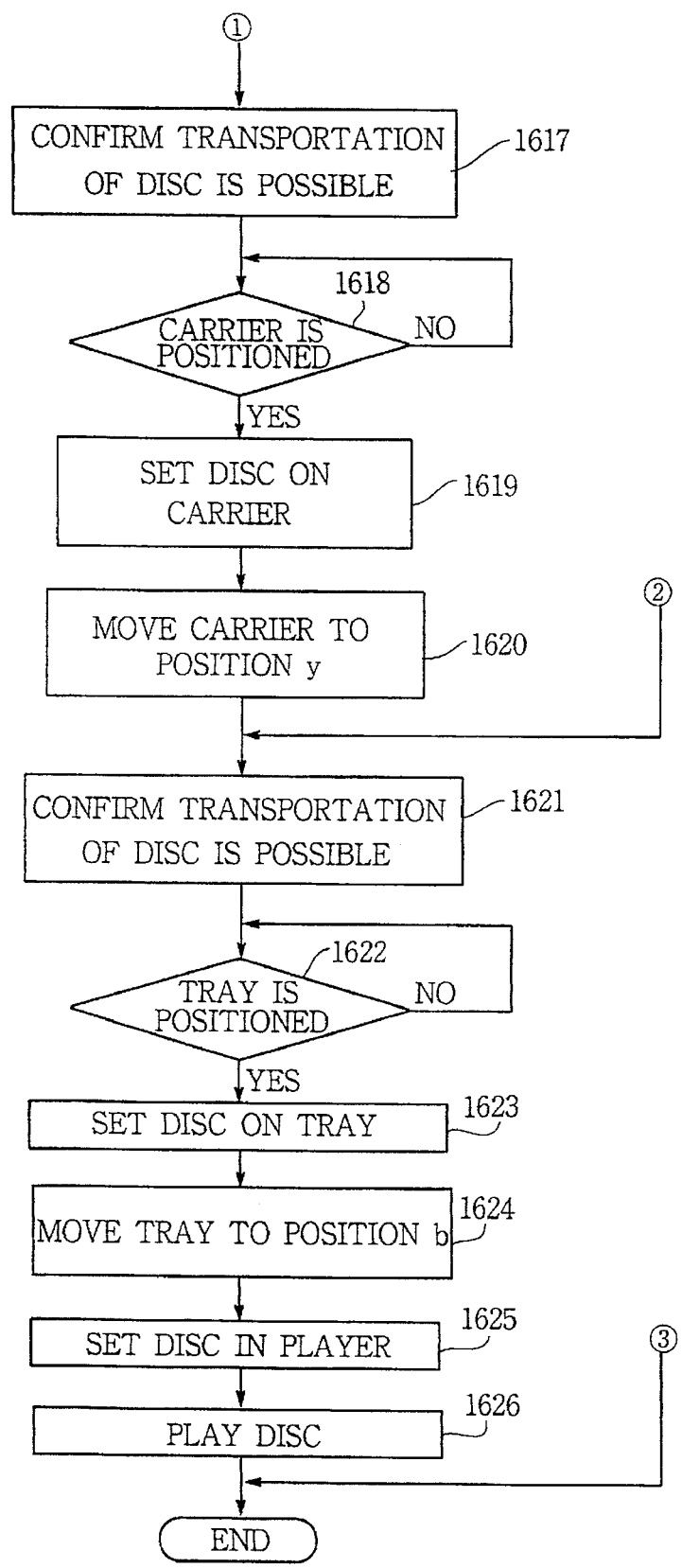

Referring to FIGS. 14 and 15 showing a flowchart for playing one of the discs 140, the disc player 160 on which the disc 140 is to be played is selected. At a step 1601, the condition of the selected player 160 is confirmed. When the player is being used, the program goes to a step 1603 where error process is executed. When the player 160 is not used, the program goes to a step 1604 where the condition of the selected disc 140 is confirmed. When it is determined at a step 1605 that the selected disc 140 is set in another player, error process is executed at the step 1603. When the selected disc 140 is set in none of the players 160, routines A, B and C are simultaneously executed. The operation will be described, supposing that the selected disc 140 is stored in the stocker unit 100 and the selected player is in the player unit 110. In the routine A, at a step 1606, a tray 155a of the carrier 155 is moved to a position a shown in FIG. 4, where the selected disc 140 is stocked. The handling device 156 (FIG. 5) of the carrier 155 is operated to take out the selected disc 140 and mounts it on the tray 155a at a step 1607. Thereafter, the carrier 155 is raised to a waiting position x.

The routine B describes the operation of the carrier 180. At a step 1609, the carrier 180 is moved to the position x. At a step 1610, the movement of the carrier 180 is confirmed so as to determine that the carrier 180 is actually positioned at the position x at a step 1611. Thereafter, the carrier movement completion signal is generated at a step 1612.

At s step 1617, it is confirmed that the disc 140 on the tray 155a of the carrier 155 can be mounted on the carrier 180. After confirming that the carrier 180 is at the position x at a step 1618, the disc 140 is set on the carrier 180 at a step 1619. At a step 1620, the carrier 180 is moved to the position y of the player unit 110.

Meanwhile, in the routine C, the carrier 155 of the player unit 110 having a tray 155b, is moved to the position y in the upper portion of the unit 110 at a step 1613. At a step 1614, the movement of the carrier 155 is confirmed. When it is determined that the carrier 155 actually arrived at the position y at a step 1615, a carrier movement completion signal is generated at a step 1616.

Thereafter, at a step 1621, it is confirmed that the disc 140 on the carrier 155 can be mounted on the tray 155b of the carrier 155. After confirming that the carrier 155 is at the position y at a step 1622, the disc 140 is set on the tray 155b at a step 1623. At a step 1624, the carrier 155 is moved to a position b confronting an opening 160a of the selected player 160. Thereafter, the disc 140 is loaded in the player 160 at a step 1625 and played at a step 1626.

Figure 4:
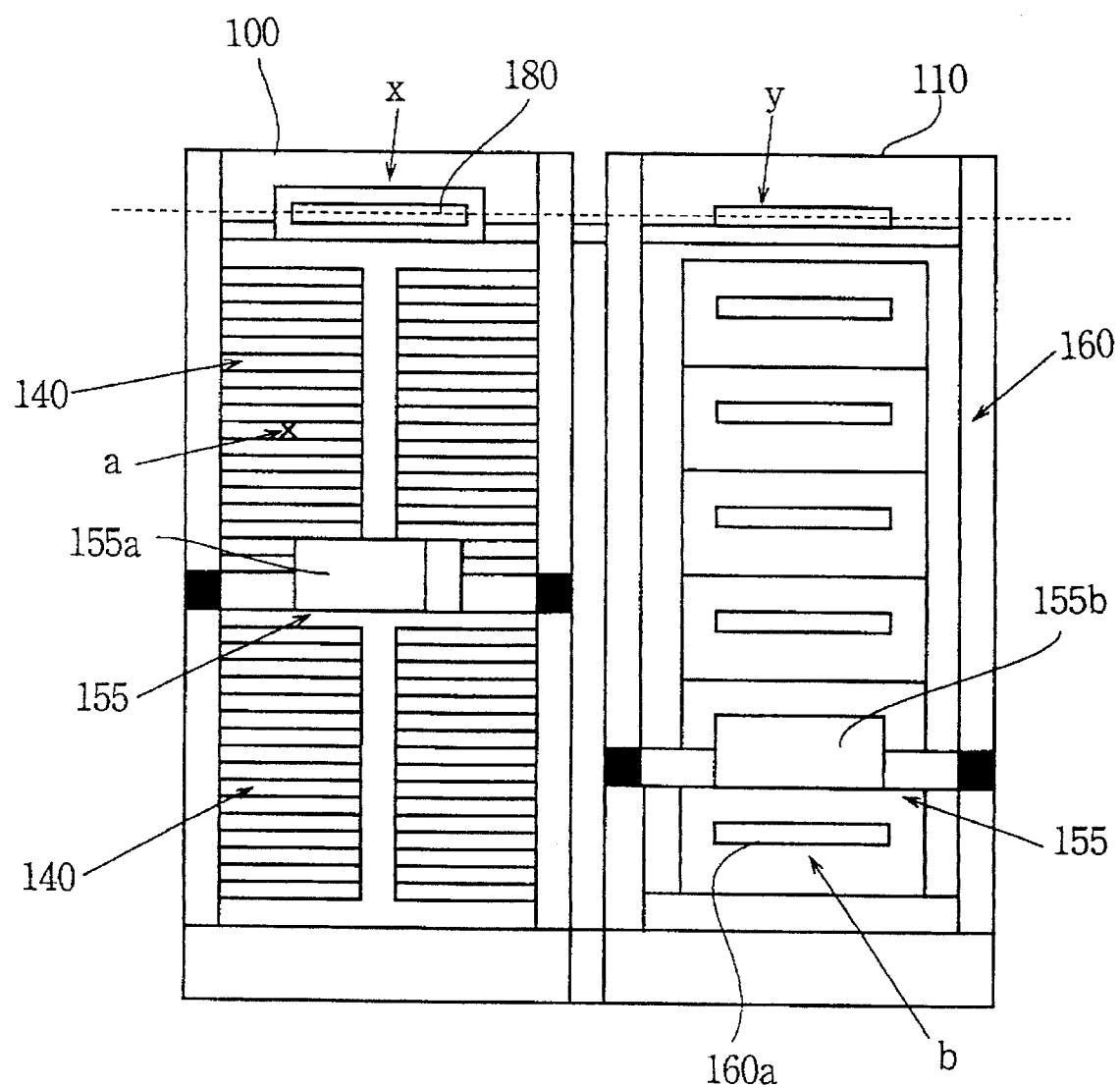
FIG. 4 is a detailed elevational view showing a part of the automatic disc player system of FIG. 1.
Figure 16:
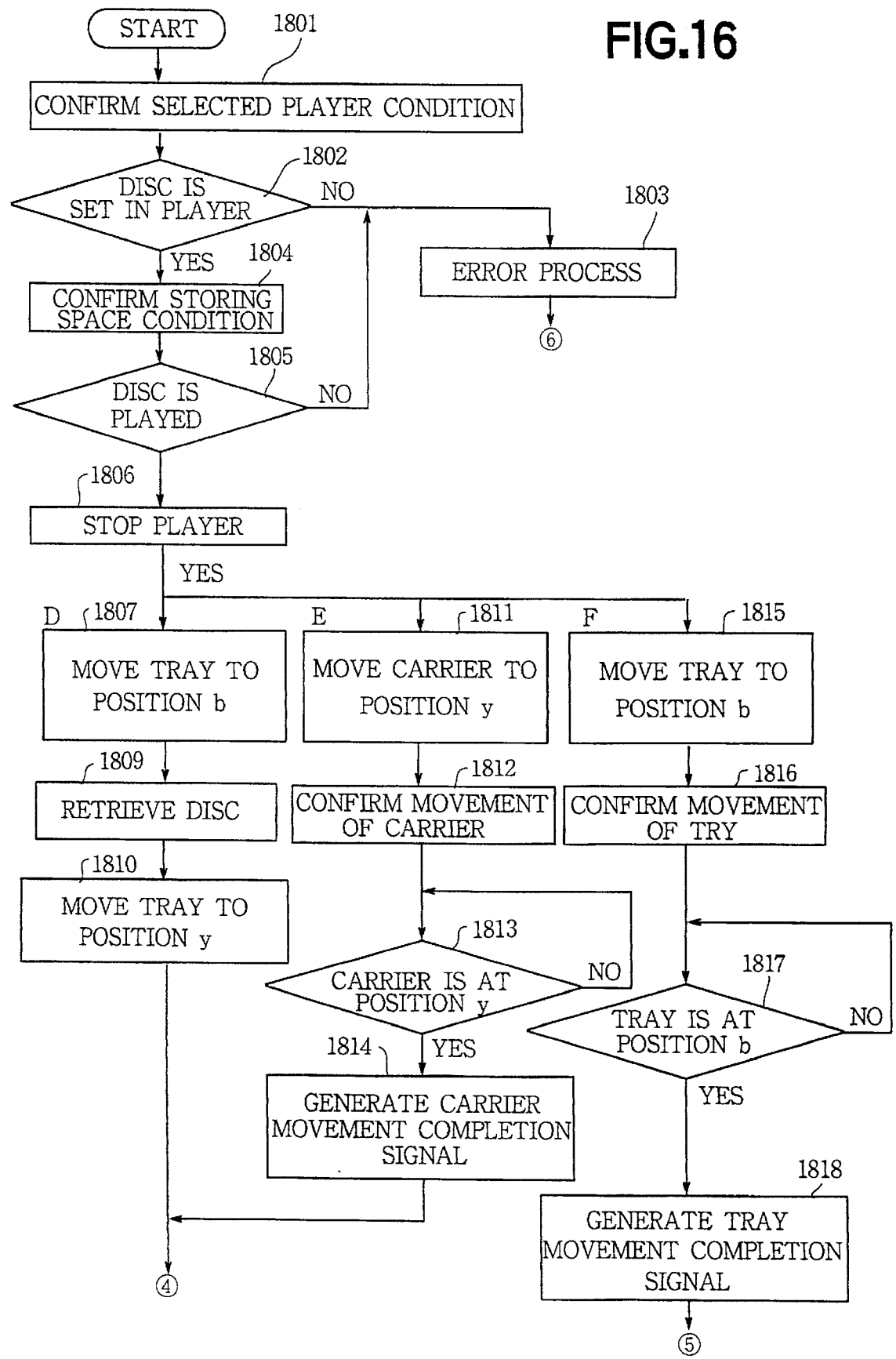
FIGS. 16 and 17 show a flowchart explaining the operation of the automatic disc player for returning the disc to its initial position.
Figure 17:
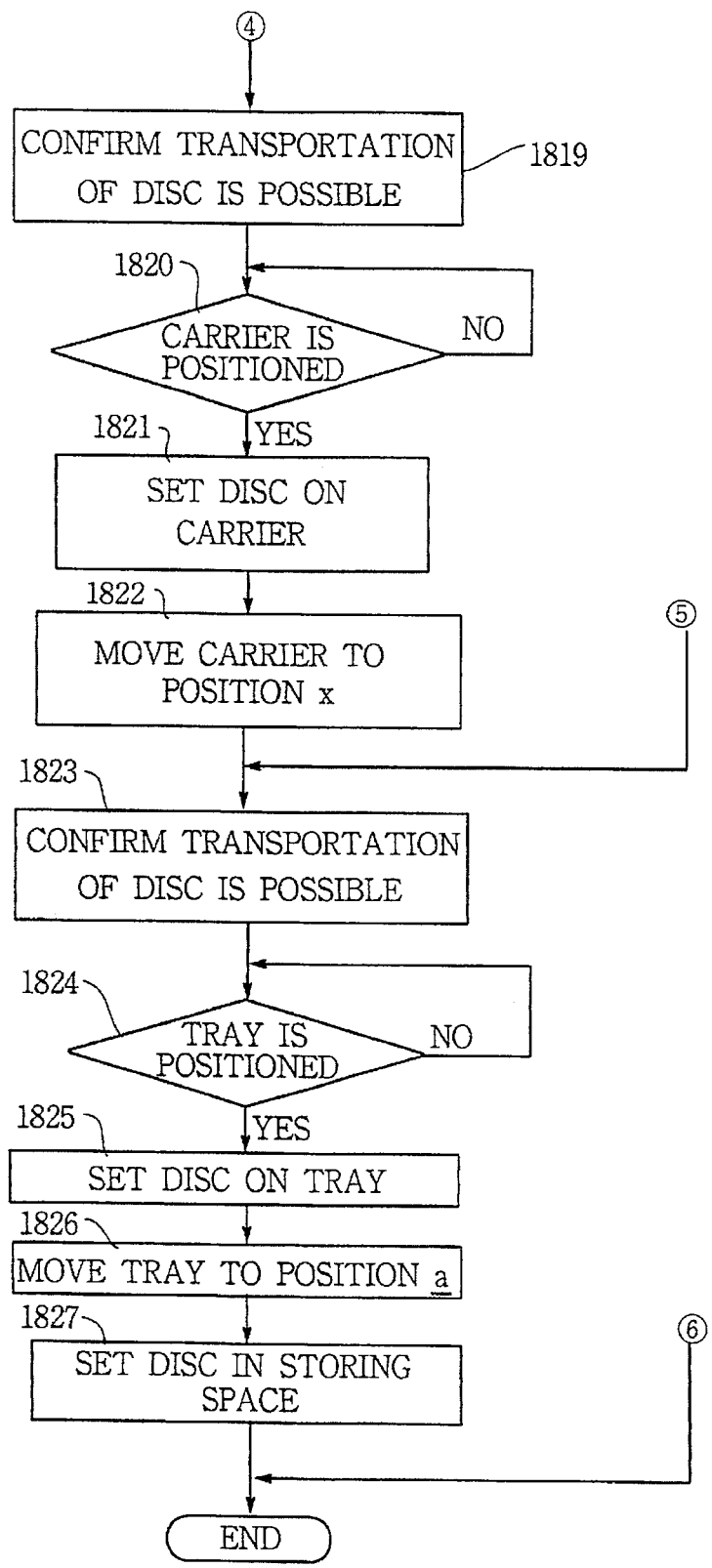
Figure 18:
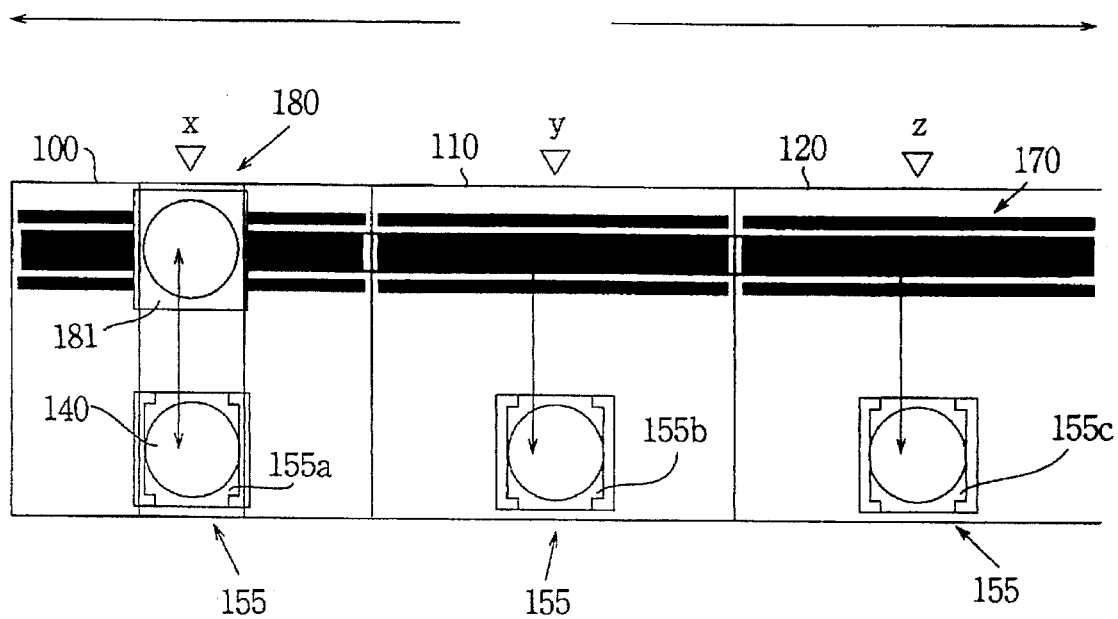
FIGS. 18 and 19 are schematic plan views each showing a part of the automatic disc player system for explaining the operation of the carrier system.
Figure 19:
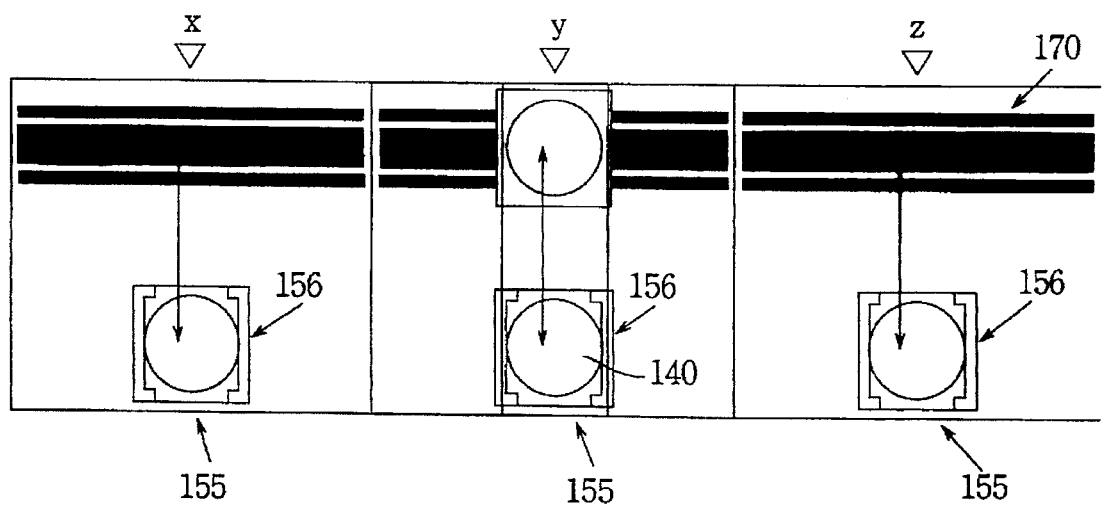

Referring to FIGS. 16 and 17, when the disc 140 stops playing, at a step 1801, the condition of the selected player 160 is confirmed. When the disc 140 is not set in the player 160, the program goes to a step 1803 where error process is executed. When the disc is in the player 160, the program goes to a step 1804 where the condition of the storing place of the disc 140 in the stocker unit 100 is confirmed. When it is determined at a step 1805 that a space at the address allotted to the disc 140 is open, the player 160 stops playing at a step 1806. When another disc is already in the space, error process is executed at the step 1803. Thereafter, routines D, E and F are simultaneously executed. In the routine D, at a step 1807, the tray 155b of the carrier 155 in the player unit 110 is moved to the position b (FIG. 4). At a step 1809, the carrier 155 retrieves the disc 140 from the player 160 and mounts it on the tray 155b. Thereafter, the carrier 155 is raised to the waiting position y.

In the routine E, at a step 1811, the carrier 180 is moved to the position y. At a step 1812, the movement of the carrier 180 is confirmed so as to determine that the carrier 180 is actually positioned at the position y at a step 1813. Thereafter, the carrier movement completion signal is generated at step 1814.

At a step 1819, it is confirmed that the disc 140 on the tray 155b of the carrier 155 can be mounted on the carrier 180. After confirming that the carrier 180 is at the position y at a step 1820, the disc 140 is set on the carrier 180 at a step 1821. At a step 1822, the carrier 180 is moved to the position x of the stocker unit 100.

Meanwhile, in the routine F, the tray 155a of the carrier 155 of the stocker unit 100 is moved to the position x at a step 1815. At a step 1816, the movement of the carrier 155 is confirmed. When it is determined that the tray 155a actually arrived at the position x at a step 1817, a carrier movement completion signal is generated at a step 1818.

Thereafter, at a step 1823, it is confirmed that the disc 140 on the carrier 180 can be mounted on the tray 155a of the carrier 155. After confirming that the tray 155a is at the position x at a step 1824, the disc 140 is set on the tray 155a at a step 1825. At a step 1826, the carrier 155 is moved to the position a at the address for the disc 140. Thereafter, the disc 140 is stored in the determined space of the stocker unit 100 at a step 1827.

Figure 20:
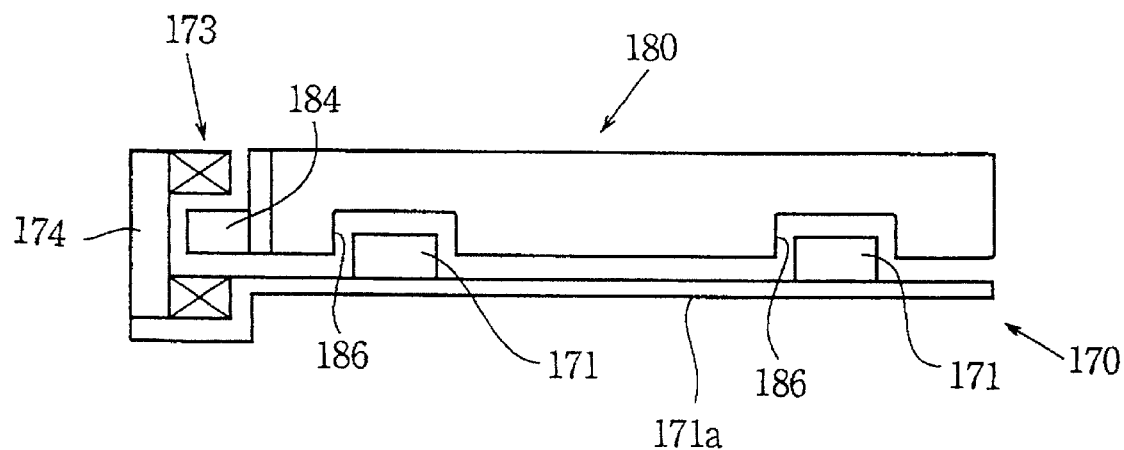
FIGS. 20 and 21 are schematic elevational views showing other embodiments of the carrier system of the present invention.

Referring to FIG. 20, the present invention may be so modified that the guide rail device 170 comprises the guide rails 171 mounted on a base 171a, and the coil device 173 is mounted on the base 171 at one side thereof. The carrier 180 has a pair of bottom guide grooves 186, each of which engaged with the guide rail 171 so that the carrier slides along the rails 171. The magnet 184 of the carrier 180 is attached on the side of the carrier 180 so as to be inserted in a space between the coils wound on the coil base 174 of the coil device 173.

Figure 21:
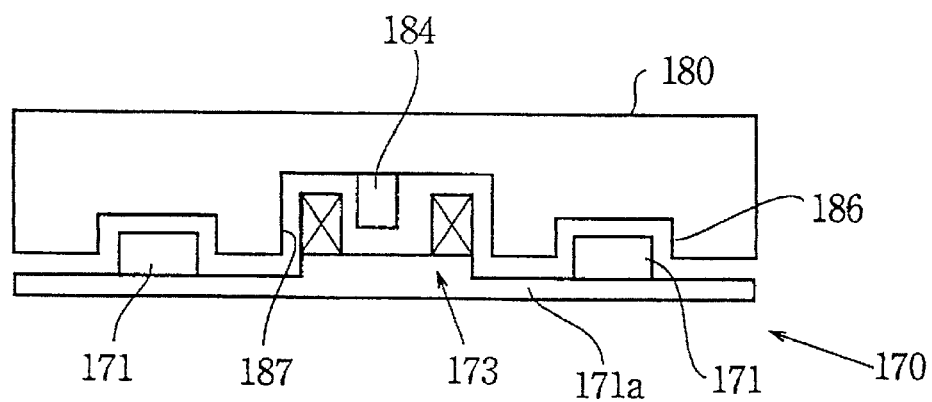
Figure 22:
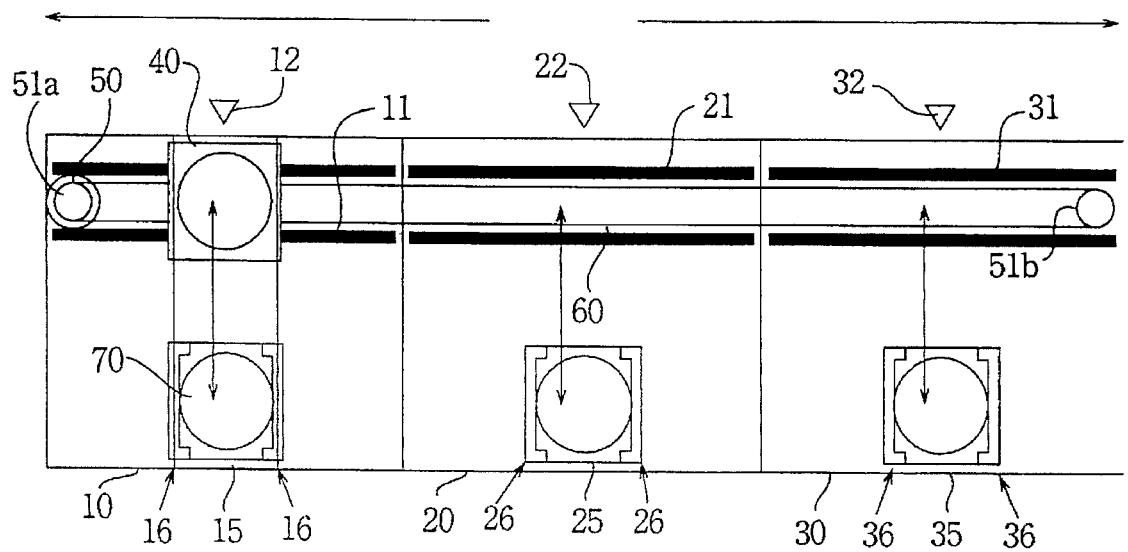
FIG. 22 is a plan view of a conventional automatic disc player system.
Figure 23:
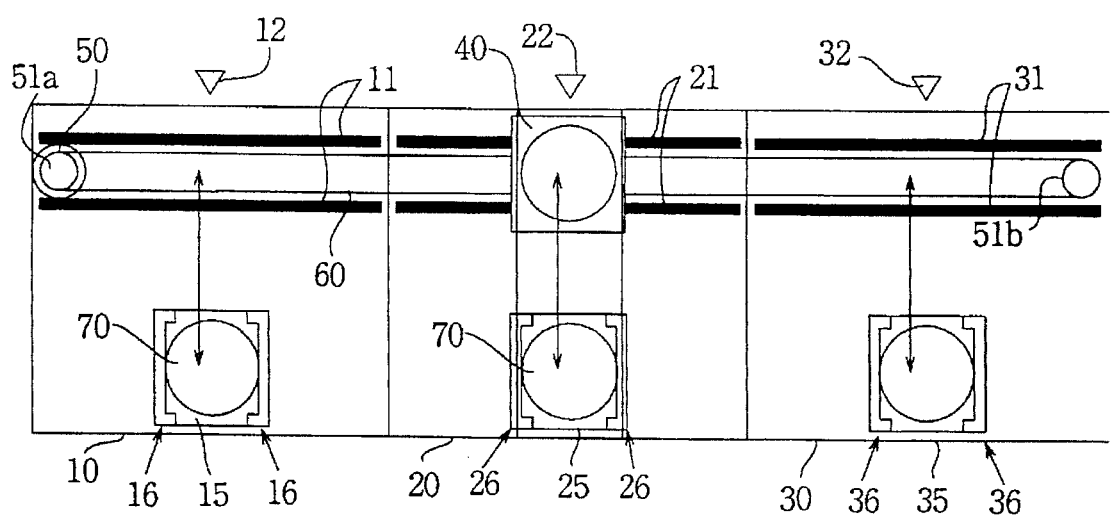
FIG. 23 is a plan view of the disc player system for explaining the operation thereof.

In a third embodiment of the present invention shown in FIG. 21, the guide rails 171 of the guide rail device 170 is mounted on base 171a as in the second embodiment, and the coil device 173 is mounted on the base 171a as in the second embodiment, and the coil device is mounted on the base 171a between the guide rails 171. The carrier 180 has a center groove 187 in addition to the guide grooves 186. The magnet 184 is mounted on the bottom of the carrier 180 in the groove 187 so as to be disposed between the coils of the coil device 173.

The present invention may be applied to devices for carrying medium other than discs.

In accordance with the present invention, the carrier is moved by the magnetic force generated between the carrier and the guide rail device. Accordingly, the pulley device is no longer necessary. Furthermore, the carrier need not be provided with lines for supplying electricity. As a result, the units provided in the automatic disc player system can be added and removed, or changed of their positions as desired.

In addition, the guide rails of the guide rail device of the present invention each has the ends thereof cut away at the upper surface. Hence, although the guide rails may be deviated from the initial horizontal positions thereof, the carrier can smoothly slide along the rails.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for carrying a medium between a first box and a second box adjacent to the first box, comprising:

each of the first and second boxes having an opening on a side wall so as to oppose to an opening formed on a side wall of the adjacent box;

a horizontal guide rail device comprising a plurality of guide rails, and provided in each of the first and second boxes, extending to the opening thereof;

a horizontal carrier having a plurality of rollers so as to be moved along the guide rails of the first and second boxes passing through the openings;

each of the guide rails having a slant on a surface at an end on which the guide roller is mounted, the slant being located to correspond to a slant of the guide rail of the adjacent box;

a plurality of coils mounted on each of the guide rail devices, arranged in a moving direction of the horizontal carrier;

a first magnet provided on the horizontal carrier to form a magnetic field passing through some of the coils;

detector means for detecting a position of the horizontal carrier and for producing a position signal;

exciting means for sequentially exciting the coils in the moving direction;

control means responsive to the position signal for controlling the exciting means for moving the horizontal carrier in the moving direction.

2. The system according to claim 1 wherein the detector means comprises a second magnet provided on the horizontal carrier and a plurality of Hall elements disposed on each of the guide rail devices opposed to the second magnet, arranged in the moving direction.

3. The system according to claim 1 wherein the first box stocks a plurality of recording medium vertically arranged, and the second box is provided with a plurality of vertically arranged players for the recording mediums.

4. The system according to claim 3 wherein each of the first and second boxes has a vertical carrier for carrying a selected one of the plurality of recording medium to the horizontal carrier.

* * * * *